(12) United States Patent
Nishita (10) Patent No.: US 10,605,600 B2
(45) Date of Patent: Mar. 31, 2020

(54) SURVEYING SYSTEM

(71) Applicant: TOPCON Corporation, Itabashi-ku, Tokyo-to (JP)

(72) Inventor: Nobuyuki Nishita, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 42 days.

(21) Appl. No.: 16/103,167

(22) Filed: Aug. 14, 2018

(65) Prior Publication Data

US 2019/0063920 A1 Feb. 28, 2019

(30) Foreign Application Priority Data

Aug. 28, 2017 (JP) ................................. 2017-163344

(51) Int. Cl.

| | |
|---|---|
| *G01C 15/00* | (2006.01) |
| *G01S 7/481* | (2006.01) |
| *G01S 7/48* | (2006.01) |
| *G01S 17/42* | (2006.01) |
| *G01S 17/66* | (2006.01) |
| *G01S 17/89* | (2020.01) |

(52) U.S. Cl.
CPC .......... *G01C 15/002* (2013.01); *G01S 7/4808* (2013.01); *G01S 7/4817* (2013.01); *G01S 17/42* (2013.01); *G01S 17/66* (2013.01); *G01S 17/89* (2013.01)

(58) Field of Classification Search
CPC ....... G01C 15/002; G01S 17/66; G01S 17/89; G01S 17/42; G01S 7/4808; G01S 7/4817
USPC ...................................................... 250/206.1
See application file for complete search history.

(56) References Cited

U.S. PATENT DOCUMENTS 9,395,174 B2 * 7/2016 Bridges ..................... G06T 7/73
9,967,545 B2 * 5/2018 Tohme ................. G01C 15/002
(Continued)

FOREIGN PATENT DOCUMENTS

| EP | 1130355 A2 | 9/2001 |
|---|---|---|
| EP | 3056857 A1 | 8/2016 |

(Continued)

OTHER PUBLICATIONS

European communication dated Jan. 31, 2019 in co-pending European patent application No. 18187573.3.
(Continued)

*Primary Examiner* — Seung C Sohn
(74) *Attorney, Agent, or Firm* — Nields, Lemack & Frame, LLC (57) ABSTRACT

A surveying system comprising a surveying instrument and a target having a pole and a prism which is provided on an axis of the pole, wherein the surveying instrument is configured to scan the distance measuring light with an optical center of the prism as a center by a circular scanning in a state where the prism is tracked, to calculate point cloud data of two points at which the pole intersects with the circular scanning, the axis of the pole and a tilt angle of the axis of the pole, a straight line on the pole which intersects with the circular scanning at two points, three-dimensional coordinates of two intersection points of the straight line and the circular scanning, and three-dimensional coordinates of the optical center of the prism, and to calculate three-dimensional coordinates of a measuring point based on the calculation result.

10 Claims, 8 Drawing Sheets

(56) References Cited

U.S. PATENT DOCUMENTS

| | | |
|---|---|---|
| 2006/0176473 A1 | 8/2006 | Yasutomi et al. |
| 2014/0247439 A1 | 9/2014 | Neier et al. |
| 2016/0238385 A1 | 8/2016 | Ohtomo et al. |
| 2016/0238708 A1 | 8/2016 | Ohtomo et al. |
| 2017/0168142 A1 | 6/2017 | Kumagai et al. |
| 2017/0227357 A1 | 8/2017 | Ohtomo et al. |
| 2019/0063922 A1 | 2/2019 | Ohtomo et al. |

FOREIGN PATENT DOCUMENTS

| | | |
|---|---|---|
| EP | 3179209 A1 | 6/2017 |
| JP | 2016-151422 A | 8/2016 |
| JP | 2016-151423 A | 8/2016 |
| JP | 2017-106813 A | 6/2017 |
| JP | 2017-142081 A | 8/2017 |
| WO | 2016/007411 A1 | 1/2016 |

OTHER PUBLICATIONS

European communication dated Feb. 15, 2019 in corresponding European patent application No. 18188511.2.

\* cited by examiner

SURVEYING SYSTEM

BACKGROUND OF THE INVENTION

The present invention relates to a surveying system which installs a retro-reflector at a measuring point, performs a distance measurement on the retro-reflector and calculates three-dimensional coordinates of the measuring point.

In general, when performing a survey of desired measuring points, a surveying operation is carried out by using a prism or the like having a retro-reflectivity. Since the prism has a size, an optical reflecting point of the prism cannot be directly installed at the measuring point.

Therefore, in the survey using the prism, the prism is provided at a known position from a lower end of a tripod or a pole, the tripod or the pole is installed at the measuring point, after an adjustment is made so that the prism is positioned on a vertical line of the measuring point by a bubble tube, the prism is measured.

However, in case of performing a prism surveying at a plurality of measuring points, since a leveling need to be performed every time the measuring points are changed, a workability is poor.

Further, in a case where a corner of a room is set as the measuring point or the like, such as a case where the pole cannot be vertically leveled and the prism cannot be installed on the vertical line of the measuring point, a surveying operation using the prism cannot be carried out.

SUMMARY OF THE INVENTION

It is an object of the present invention to provide a surveying system capable of performing a prism surveying even in a case where a prism cannot be installed on a vertical line of a measuring point.

To attain the object as described above, a surveying system according to the present invention has a surveying instrument and a target installed at a measuring point, wherein the surveying instrument comprises a distance measuring module for emitting a distance measuring light, receiving a reflected distance measuring light and performing a distance measurement, a tracking module which has a light emitter for emitting a tracking light onto an optical axis of the distance measuring light and a tracking light photodetector for receiving a reflected tracking light and performing a tracking based on a photodetecting position of the tracking light photodetector, an optical axis deflector which is provided on a common optical axis of the distance measuring light and the reflected distance measuring light and deflects the optical axis of the distance measuring light and an optical axis of the reflected distance measuring light at the same deflection angle in the same direction, a projecting direction detecting module for detecting a deflection angle and a deflecting direction by the optical axis deflector and an arithmetic control module for controlling the distance measuring module and the tracking module, wherein the target comprises a pole of which a peripheral surface has a high reflectance and a prism which is provided on an axis of the pole and has a known distance from a lower end of the pole, and wherein the arithmetic control module is configured to scan the distance measuring light with an optical center of the prism as a center by a circular scanning in a state where the prism is tracked, to acquire point cloud data of two points at which the pole intersects with the circular scanning, to calculate the axis of the pole and a tilt angle of the axis of the pole based on the point cloud data of the two points, to calculate a straight line on the pole which is parallel to the axis of the pole and intersects with the circular scanning at two points, to calculate three-dimensional coordinates of two intersection points of the straight line and the circular scanning, to calculate three-dimensional coordinates of the optical center of the prism based on the obtained three-dimensional coordinates and an intersection point of the straight line and a direction vector of the prism from the surveying instrument, and to calculate three-dimensional coordinates of the measuring point based on the three-dimensional coordinates of the optical center of the prism, the tilt angle of the axis of the pole and a distance between the three-dimensional coordinates of the optical center of the prism and the lower end of the pole.

Further, in the surveying system according to a preferred embodiment, a distance between the lower end of the pole and the optical center of the prism is known, an electronic distance meter having an optical axis coinciding with the axis of the pole is provided, and the arithmetic control module is configured to calculate the three-dimensional coordinates of the measuring point based on the three-dimensional coordinates of the optical center of the prism, the tilt angle of the axis of the pole, the distance between the optical center of the prism and a measurement, reference position of the electronic distance meter and a distance measurement result of the electronic distance meter.

Further, in the surveying system according to the preferred embodiment, the surveying instrument comprises a surveying instrument main body which accommodates the distance measuring module, the optical axis deflector, the projecting direction detecting module, the tracking module and the arithmetic control module, a supporting unit for supporting the surveying instrument main body rotatably in an up-and-down direction and a left-and-right direction, a rotary driving unit for rotating the surveying instrument main body in the up-and-down direction and the left-and-right direction and angle detectors for detecting an up-and-down angle and a left-and-right angle of the surveying instrument main body.

Further, in the surveying system according to the preferred embodiment, the optical axis deflector is a pair of disk-like optical prisms which are independently rotatable and overlap each other, each of the optical prisms has a distance measuring optical axis deflecting unit which is formed at a central part of the optical axis deflector and deflects the distance measuring light at a required deflection angle in a required direction and a reflected distance measuring optical axis deflecting unit which is formed at an outer peripheral part of the optical axis deflector and deflects the reflected distance measuring light at the same deflection angle in the same direction with respect to the distance measuring optical axis deflecting unit.

Further, in the surveying system according to the preferred embodiment, each of the optical prisms is a Fresnel prism.

Furthermore, in the surveying system according to the preferred embodiment, the target has the pole, a reflecting plate provided on the pole and the prism provided on the reflecting plate in such a manner that an optical center is positioned on the axis of the pole, and a reference line which runs through the optical center of the prism and is parallel to the axis of the pole is formed on the reflecting plate, and wherein the arithmetic control module is configured to scan the distance measuring light by the circular scanning in such a manner that a locus is included within the reflecting plate with the optical center of the prism as the center in a state where the prism is tracked, to calculate three-dimensional coordinates of two intersection points of the circular scanning and the reference line, to calculate the axis of the pole and the tilt angle of the axis of the pole based on the obtained three-dimensional coordinates, to calculate an intersection point of a straight line connecting the two intersection points and the direction vector of the prism from the surveying instrument as the three-dimensional coordinates of the optical center of the prism, and to calculate the three-dimensional coordinates of the measuring point based on the three-dimensional coordinates of the optical center of the prism, the tilt angle of the axis of the pole, and the distance between the three-dimensional coordinates of the optical center of the prism and the lower end of the pole.

According to the present invention, the surveying system has a surveying instrument and a target installed at a measuring point, wherein the surveying instrument comprises a distance measuring module for emitting a distance measuring light, receiving a reflected distance measuring light and performing a distance measurement, a tracking module which has a light emitter for emitting a tracking light onto an optical axis of the distance measuring light and a tracking light photodetector for receiving a reflected tracking light and performing a tracking based on a photodetecting position of the tracking light photodetector, an optical axis deflector which is provided on a common optical axis of the distance measuring light and the reflected distance measuring light and deflects the optical axis of the distance measuring light and an optical axis of the reflected distance measuring light at the same deflection angle in the same direction, a projecting direction detecting module for detecting a deflection angle and a deflecting direction by the optical axis deflector and an arithmetic control module for controlling the distance measuring module and the tracking module, wherein the target comprises a pole of which a peripheral surface has a high reflectance and a prism which is provided on an axis of the pole and has a known distance from a lower end of the pole, and wherein the arithmetic control module is configured to scan the distance measuring light with an optical center of the prism as a center by a circular scanning in a state where the prism is tracked, to acquire point cloud data of two points at which the pole intersects with the circular scanning, to calculate the axis of the pole and a tilt angle of the axis of the pole based on the point cloud data of the two points, to calculate a straight line on the pole which is parallel to the axis of the pole and intersects with the circular scanning at two points, to calculate three-dimensional coordinates of two intersection points of the straight line and the circular scanning, to calculate three-dimensional coordinates of the optical center of the prism based on the obtained three-dimensional coordinates and an intersection point of the straight line and a direction vector of the prism from the surveying instrument, and to calculate three-dimensional coordinates of the measuring point based on the three-dimensional coordinates of the optical center of the prism, the tilt angle of the axis of the pole and a distance between the three-dimensional coordinates of the optical center of the prism and the lower end of the pole. As a result, there is no need to level so that the optical center of the prism is positioned on the vertical line of the measuring point when the prism surveying is performed, and a reduction in a working time and an improvement in a working efficiency can be realized.

DETAILED DESCRIPTION OF THE PREFERRED EMBODIMENT

A description will be given on an embodiment of the present invention by referring to the attached drawings.

First, by referring to FIG. 1, a description will be given on a surveying system according to a first embodiment of the present invention. It is to be noted that, in FIG. 1, to facilitate an understanding, a direction of a surveying instrument is shown back to front for a convenience purpose.

A surveying system 1 has a surveying instrument 2 and a target 3. The surveying instrument 2 is, for instance, a laser scanner having a tracking function and is provided on a tripod 4. Three-dimensional coordinates of the surveying instrument 2 are known.

The target 3 has a pole 5 which is in a cylindrical shape and installed at a measuring point 10 and a prism 6 provided on the pole 5. A lower end portion of the pole 5 is designed in a conical shape where a diameter is reduced toward a downward direction, and a lower end is designed as a tip. Further, a reflection sheet as a retro-reflector is provided on a peripheral surface of the pole 5, for instance, and the pole 5 has a high reflectance. A distance between an optical center of the prism 6 and the lower end of the pole 5 is known. It is to be noted that, in FIG. 1, reference numeral 30 denotes a distance measuring optical axis (to be described later), and reference numeral 62 denotes a range which is picked up by a tracking light photodetector (to be described later).

Figure 2:
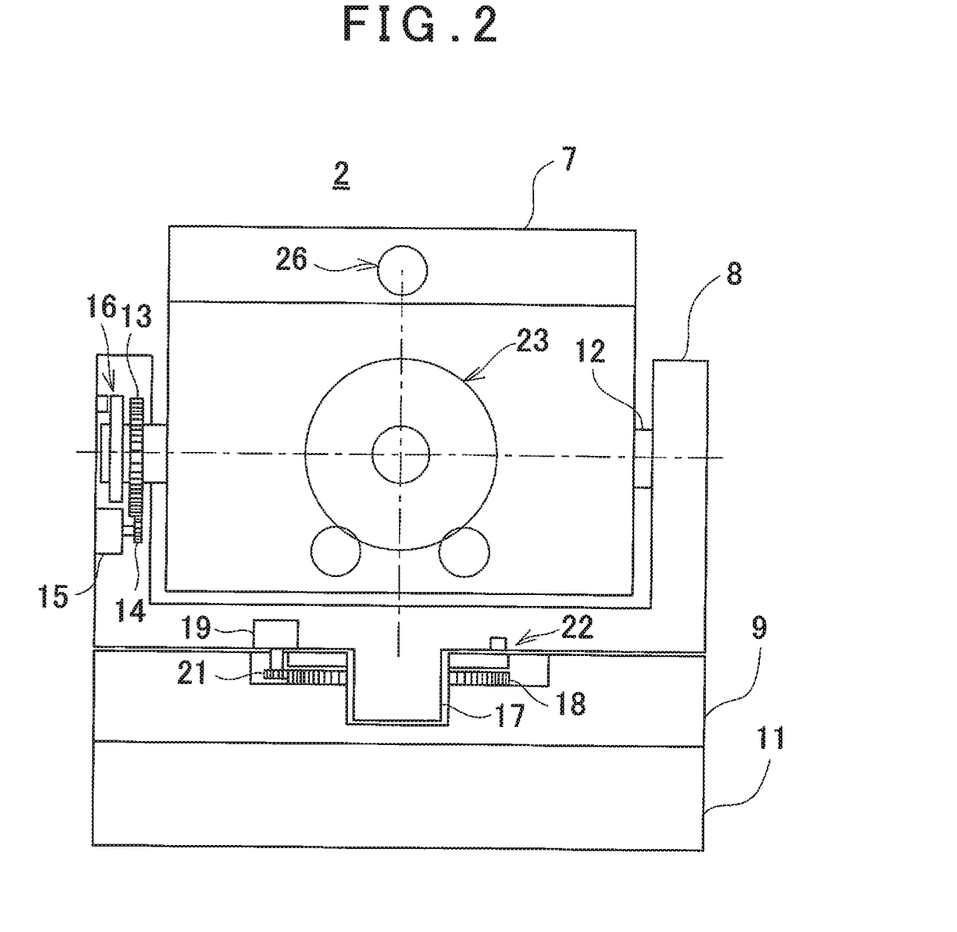
FIG. 2 is a front view of a surveying instrument according to the first embodiment of the present invention.
Figure 3:
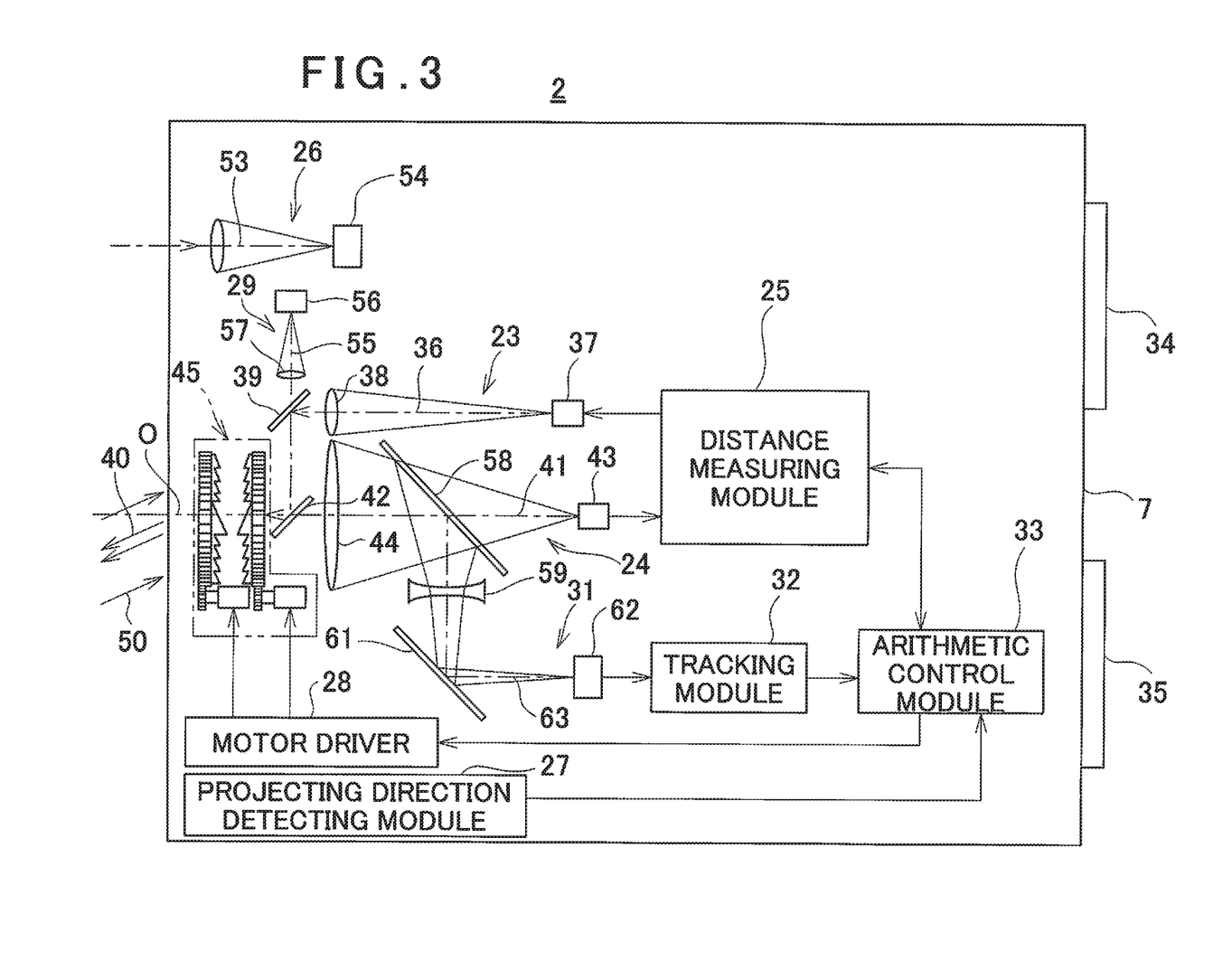
FIG. 3 is a schematical drawing to show an optical system of the surveying instrument.

Next, a detailed description of the surveying instrument 2 will be given by referring to FIG. 2 and FIG. 3. The surveying instrument 2 has a surveying instrument main body 7, a frame 8, a base unit 9 and a surveying base plate 11.

The frame 8 is designed in a recessed shape having a recessed portion, and the surveying instrument main body 7 is accommodated in the recessed portion. The surveying instrument main body 7 is supported by the frame 8 via an up-and-down rotation shaft 12 and is configured to be rotatable around the up-and-down rotation shaft 12 integrally with the up-and-down rotation shaft 12 in an up-and-down direction.

An up-and-down driven gear 13 is fitted on an end portion of the up-and-down rotation shaft 12. The up-and-down driven gear 13 meshes with an up-and-down driving gear 14, and the up-and-down driving gear 14 is fixed to an output shaft of an up-and-down driving motor 15. The surveying instrument main body 7 is configured to be rotated in the up-and-down direction by the up-and-down driving motor 15.

Further, an up-and-down rotation angle detector 16 (for instance, an encoder), which detects an up-and-down angle (an angle in a rotating direction around the up-and-down rotation shaft 12), is provided between the up-and-down rotation shaft 12 and the frame 8. The up-and-down rotation angle detector 16 detects a relative rotation angle of the surveying instrument main body 7 in the up-and-down direction with respect to the frame 8.

A left-and-right rotation shaft 17 is protruded from a lower surface of the frame 8, and the left-and-right rotation shaft 17 is rotatably fitted in the base unit 9 via a bearing (not shown). The frame 8 is configured to be rotatable around the left-and-right rotation shaft 17 in a left-and-right direction.

A left-and-right driven gear 18 is fixed to the base unit 9 concentrically with the left-and-right rotation shaft 17. A left-and-right driving motor 19 is provided in the frame 8, and a left-and-right driving gear 21 is fixed to an output shaft of the left-and-right driving motor 19. The left-and-right driving gear 21 meshes with the left-and-right driven gear 18. The frame 8 is configured to be rotated in the left-and-right direction integrally with the left-and-right rotation shaft 17 by the left-and-right driving motor 19.

Further, a left-and-right rotation angle detector 22 (for instance, an encoder), which detects a left-and-right angle (an angle in a rotating direction around the left-and-right rotation shaft 17), is provided between the left-and-right rotation shaft 17 and the base unit 9. The left-and-right rotation angle detector 22 detects a relative rotation angle of the frame 8 in the left-and-right direction with respect to the base unit 9. The up-and-down rotation angle detector 16 and the left-and-right rotation angle detector 22 make up an angle detector for detecting rotation angles in the up-and-down direction and the left-and-right direction of the surveying instrument main body 7.

Further, the base unit 9 is provided on the surveying base plate 11, and the surveying base plate 11 is installed on the tripod 4. The surveying base plate 11 has a leveling mechanism and functions as a leveling unit which performs a leveling of the surveying instrument main body 7.

By a cooperative operation between the up-and-down driving motor 15 and the left-and-right driving motor 19, the surveying instrument main body 7 can be directed to a desired direction. It is to be noted that the frame 8 and the base unit 9 make up a supporting unit of the surveying instrument main body 7. Further, the up-and-down driving motor 15 and the left-and-right driving motor 19 make up a rotary driving unit of the surveying instrument main body 7.

In the surveying instrument main body 7, a distance measuring light projecting unit 23, a light receiving unit 24, a distance measuring module 25, an image pickup unit 26, a projecting direction detecting module 27, a motor driver 28, a tracking light projecting unit 29, a tracking light receiving unit 31, a tracking module 32 and an arithmetic control module 33, which is a measurement control module, are accommodated and integrated. Further, to the surveying instrument main body 7, an operation unit 34 and a display unit 35 are provided. It is to be noted that the display unit 35 may be designed as a touch panel and also may be served as the operation unit 34.

The distance measuring light projecting unit 23 has a projection optical axis 36, and a light emitter 37 such as a laser diode (LD), for instance, is provided on the projection optical axis 36. Further, a projecting lens 38 is provided on the projection optical axis 36. Further, by a first reflection mirror 39 as a deflecting optical component provided on the projection optical axis 36 and by a second reflection mirror 42 as a deflecting optical component provided on a light receiving optical axis 41 (to be described later), the projection optical axis 36 is deflected so as to coincide with the light receiving optical axis 41. It is to be noted that the first reflection mirror 39 and the second reflection mirror 42 make up a projection optical axis deflector.

It is to be noted that the first reflection mirror 39 has a wavelength selecting function. The first reflection mirror 39 is a beam splitter which has optical characteristics of, for instance, reflecting a distance measuring light 40 and passing through a tracking light as described later.

The light receiving unit 24 has the light receiving optical axis 41. A reflected distance measuring light 50 from a target having a retro-reflectivity such as an object to be measured, or a prism, a reflection mirror, or the like enters the light receiving unit 24.

On the light receiving optical axis 41, a photodetector 43, for instance, an avalanche photodiode (APD) is provided, and further an image forming lens 44 is disposed. The image forming lens 44 focuses the reflected distance measuring light 50 on the photodetector 43. The photodetector 43 receives the reflected distance measuring light 50 and produces a light receiving signal. The light receiving signal is input to the distance measuring module 25. It is to be noted that a condition where the projection optical axis 36 is coincided with the light receiving optical axis 41 is determined as a distance measuring optical axis 30 (see FIG. 1).

Further, on the light receiving optical axis 41 (that is, the projection optical axis 36), and on an object side of the image forming lens 44, that is, on a common optical axis of the distance measuring light 40 and the reflected distance measuring light 50, an optical axis deflector 45 is arranged. A description will be given below on the optical axis deflector 45 by referring to FIG. 4. It is to be noted that the distance measuring optical axis 30 in a condition not deflected by the optical axis deflector 45 is determined as a reference optical axis O.

Figure 4:
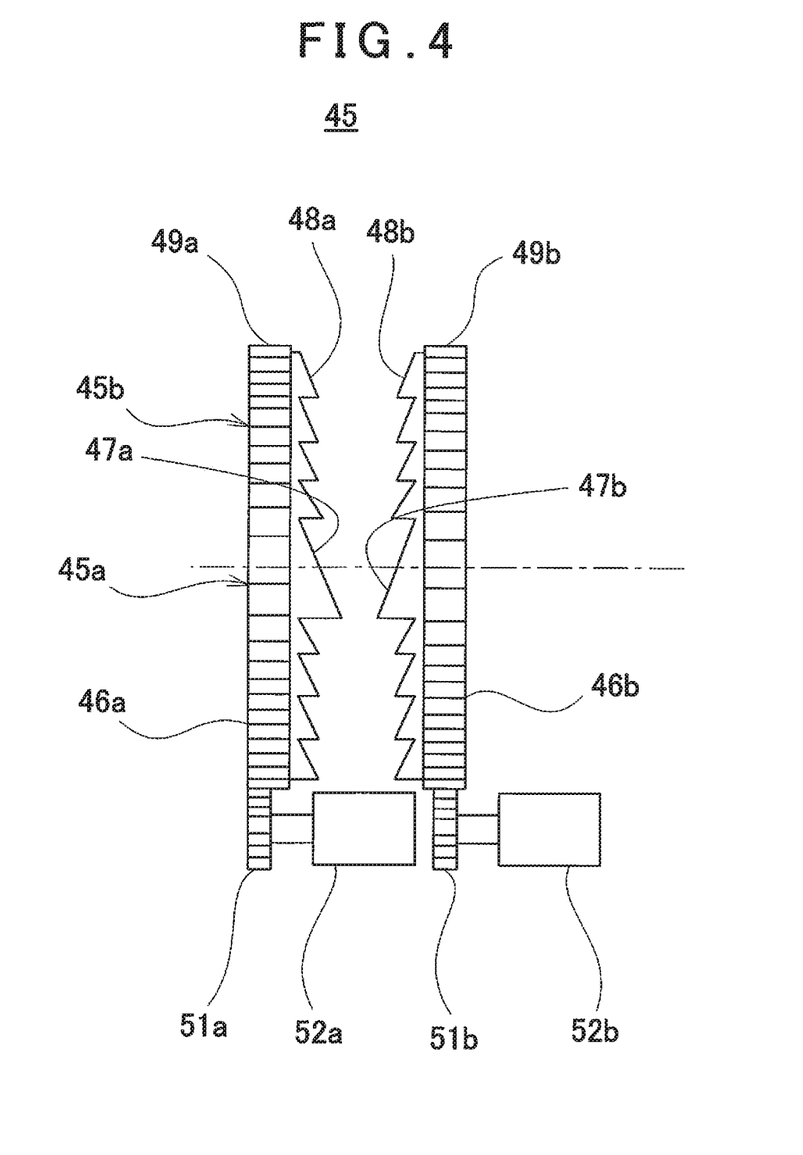
FIG. 4 is an enlarged view of an optical axis deflector of the optical system.

The optical axis deflector 45 is constituted of a pair of optical prisms 46a and 46b. The optical prisms 46a and 46b are designed in a disk-like shape respectively and disposed perpendicularly crossing the light receiving optical axis 41 on the light receiving optical axis 41. Further, the optical prisms 46a and 46b overlap each other and are arranged parallel. As for the optical prisms 46a and 46b, a Fresnel prism is preferably used in order to reduce a size of the instrument.

A central part of the optical axis deflector 45 is designed as a distance measuring optical axis deflecting unit 45a which is a first optical axis deflector which the distance measuring light 40 passes through. A part other than the central part of the optical axis deflector 45 is designed as a reflected distance measuring optical axis deflecting unit 45b which is a second optical axis deflector which the reflected distance measuring light 50 passes through.

The Fresnel prisms used as the optical prisms 46a and 46b are constituted of prism elements 47a and 47b and a large number of prism elements 48a and 48b which are formed parallel to each other respectively, and have a disk-like shape. Each of the prism elements 47a and 47b and the prism elements 48a and 48b have the same optical characteristics, respectively.

The prism elements 47a and 47b make up the distance measuring optical axis deflecting unit 45a, and the prism elements 48a and 48b make up the reflected distance measuring optical axis deflecting unit 45b. Further, each of the prism elements 47a and 47b is constituted of a single prism element. It is preferable that a width of each of the prism elements 47a and 47b is approximately equal to a diameter of the distance measuring light 40 to be emitted or larger than the diameter of the distance measuring light 40.

The Fresnel prism may be manufactured from the optical glass but may be molded from an optical plastic material. By molding the Fresnel prism from the optical plastic material, an inexpensive Fresnel prism can be manufactured.

The optical prisms 46a and 46b are disposed independently and individually rotatable with the light receiving optical axis 41 as a center, respectively. The optical prisms 46a and 46b, when their rotating directions, rotation amounts and rotating speeds are independently controlled, deflect an optical axis of the distance measuring light 40 in an arbitrary direction and deflect an optical axis (the light receiving optical axis 41) of the reflected distance measuring light 50 to be received parallel to the projection optical axis 36.

An outer shape of each of the optical prisms 46a and 46b is designed as a circle shape with the light receiving optical ax 41 as the center, respectively. Further, by taking an expansion of the reflected distance measuring light 50 into consideration, diameters of the optical prisms 46a and 46b are set so that a sufficient light amount can be obtained.

Further, a ring gear 49a is fitted with an outer periphery of the optical prism 46a, and a ring gear 49b is fitted with an outer periphery of the optical prism 46b.

A driving gear 51a meshes with the ring gear 49a, and the driving gear 51a is fixed to an output shaft of a motor 52a. Similarly, a driving gear 51b meshes with the ring gear 49b, and the driving gear 51b is fixed to an output shaft of a motor 52b. The motors 52a and 52b are electrically connected to the motor driver 28.

As the motors 52a and 52b, a motor capable of detecting a rotation angle or a motor which rotates corresponding to a driving input value such as a pulse motor, for instance, is used. Alternatively, a rotation angle detector which detects a rotation amount (a rotation angle) of a motor such as an encoder or the like, for instance, may be used to detect the rotation amount of the motor. The rotation amounts of the motors 52a and 52b are detected respectively, and the motors 52a and 52b are individually controlled by the motor driver 28.

The driving gears 51a and 51b and the motors 52a and 52b are provided at positions not interfering with the distance measuring light projecting unit 23, for instance, on lower sides of the ring gears 49a and 49b.

It is to be noted that the projecting lens 38, the distance measuring optical axis deflecting unit 45a or the like make up a light projecting optical system, and the reflected distance measuring optical axis deflecting unit 45b, the image forming lens 41 or the like make up a light receiving optical system.

The distance measuring module 25 controls the light emitter 37, and makes the light emitter 37 to emit a laser beam as the distance measuring light 40. The projection optical axis 36 is deflected by the prism elements 47a and 47b (the distance measuring optical axis deflecting unit 45a) so that the distance measuring light 40 is directed toward a measuring point.

The reflected distance measuring light 50 as reflected from the object to be measured enters the light receiving unit 24 through the prism elements 48a and 48b (the reflected distance measuring optical axis deflecting unit 45b) and the image forming lens 44, and is received by the photodetector 43. The photodetector 43 sends a light receiving signal to the distance measuring module 25. The distance measuring module 25 performs a distance measurement of a measuring point (a point irradiated by the distance measuring light 40) based on the light receiving signal from the photodetector 43.

The image pickup unit 46 is a camera which has a field angle of, e.g., 50° and acquires image data including the object to be measured. The image pickup unit 26 has an image pickup optical axis 53 which extends in a horizontal direction when the surveying instrument main body 7 is in a horizontal position, and the image pickup optical axis 53 and the projection optical axis 36 are set so as to be parallel. Further, a distance between the image pickup optical axis 53 and the projection optical axis 36 also has a known value.

An image pickup element 54 of the image pickup unit 26 is a CCD or a CMOS sensor which is an aggregate of pixels, and is configured such that a position of each pixel can be specified on the image pickup element 54. For instance, a position of each pixel in a coordinate system having the image pickup optical axis 53 passing through the image pickup element 54 as an origin is specified. Further, a signal from each pixel includes information of the pixel coordinate and the light receiving signal.

The projecting direction detecting module 27 detects rotation angles of the motors 52a and 52b by counting driving pulses input to the motors 52a and 52b. Alternatively, based on signals from the encoders provided to the motors 52a and 52b, the projecting direction detecting module 27 detects the rotation angles of the motors 52a and 52b. Further, the projecting direction detecting module 27 calculates rotational positions of the optical prisms 46a and 46b based on the rotation angles of the motors 52a and 52b. Further, the projecting direction detecting module 27 calculates a deflection angle and a projecting direction (a deflecting direction) of the distance measuring light 40 with respect to the reference optical axis O based on refractive indexes and the rotational positions of the optical prisms 46a and 46b. A calculation result is input to the arithmetic control module 33.

It is to be noted that encoders may be provided on the optical prisms 46a and 46b respectively, and the rotational positions of the optical prisms 46a and 46b may be calculated based on detection results of the encoders.

Further, the tracking light projecting unit 29 has a tracking optical axis 55, and a light emitter 56, e.g., laser diode (LD), which emits a tracking light with a wavelength different from a wavelength of the distance measuring light 40, is provided on the tracking optical axis 55. Further, a projecting lens 57 is provided on the tracking optical axis 55. Further, the first reflection mirror 39 as a deflecting optical component is provided on the tracking optical axis 55. It is to be noted that an emission of the tracking light the light emitter 56 is controlled by the tracking module 32.

The tracking light as passed through the first reflection mirror 39 coincides with the projection optical axis 36 as deflected by the first reflection mirror 39. Further, when the tracking light is reflected by the second reflection mirror 42, the tracking light coincides with the light receiving optical axis 41 (that is, the projection optical axis 36).

Further, the tracking light receiving unit 31 has a third reflection mirror 58 which is a deflecting optical component and has a wavelength selecting function, a condenser lens 59, a fourth reflection mirror 61 as deflecting optical component and the tracking light photodetector 62.

The third reflection mirror 58 is provided on the light receiving optical axis 41. The third reflection mirror 58 has optical characteristics to reflect a reflected tracking light and pass through the reflected distance measuring light 50 with a different wavelength. Further, the tracking light receiving unit 31 has a tracking light receiving optical axis 63 as branched from the light receiving optical axis 41 by the third reflection mirror 58. The fourth reflection mirror 61 and the tracking light photodetector 62 are provided on the tracking light receiving optical axis 63. Further, the condenser lens 59 is arranged between the third reflection mirror 58 and the fourth reflection mirror 61.

In a case where a detection and a tracking of the target are performed, a reflection mirror with a retro-reflectivity as the object to be measured, for instance, the prism 6 is used. The reflected tracking light as reflected by the prism 6 is passed through the optical axis deflector 45, reflected by the third reflection mirror 58, condensed by the condenser lens 59, deflected onto the tracking light receiving optical axis 63 by the fourth reflection mirror 61 and received by the tracking light photodetector 62. The tracking light photodetector 62 is a CCD or a CMOS sensor which is an aggregate of pixels, and is configured such that a position of each pixel on the tracking light photodetector 62 can be specified with a position of the tracking light receiving optical axis 63 as a reference position. The tracking light photodetector 62 receives the reflected tracking light and produces a light receiving signal based on a light receiving on the tracking light photodetector 62. The light receiving signal is input to the tracking module 32.

The tracking module 32 detects the prism 6 based on a light receiving of the reflected tracking light on the tracking light photodetector 62, and further calculates a position on the tracking light photodetector 62. The tracking module 32 calculates a deviation between a reference position of the tracking light photodetector 62 and a photodetecting position of the prism 6. A calculation result is input to the arithmetic control module 33. The arithmetic control module 33 calculates a deflecting direction based on the deviation between the reference position and the photodetecting position and controls the optical axis deflector 45 based on the calculation result so that the photodetecting position coincides with the reference position.

The arithmetic control module 33 is constituted of an input/output control module, an arithmetic unit (CPU), a storage module, or the like. In the storage module, various types of programs are stored. These programs include: a distance measuring program for controlling a distance measuring action, a detecting program for detecting a target as described later, a tracking program for controlling a tracking action, a prism control program for making the motor driver 28 control a driving of the motors 52a and 52b, a main body control program for controlling a driving of the up-and-down driving motor 15 and the left-and-right driving motor 19, a directional angle calculation program for calculating a directional angle (a horizontal angle, a vertical angle) of the distance measuring light 40 based on a calculation result of a projecting direction of the distance measuring light 40 from the projecting direction detecting module 27 and the detection results of the up-and-down rotation angle detector 16 and the left-and-right rotation angle detector 22, an image preparing program for preparing an image with three-dimensional data on which three-dimensional coordinates are given for each pixel based on a measurement result and image data, an image display program for displaying the image data, distance measurement data, or the like on the display unit 35, and other programs. Further, the storage module also stores the distance measurement data, the image data, rotational position data of the optical prisms 46a and 46b, set value data of when the motors 52a and 52b are controlled, and the like.

Figure 5A:
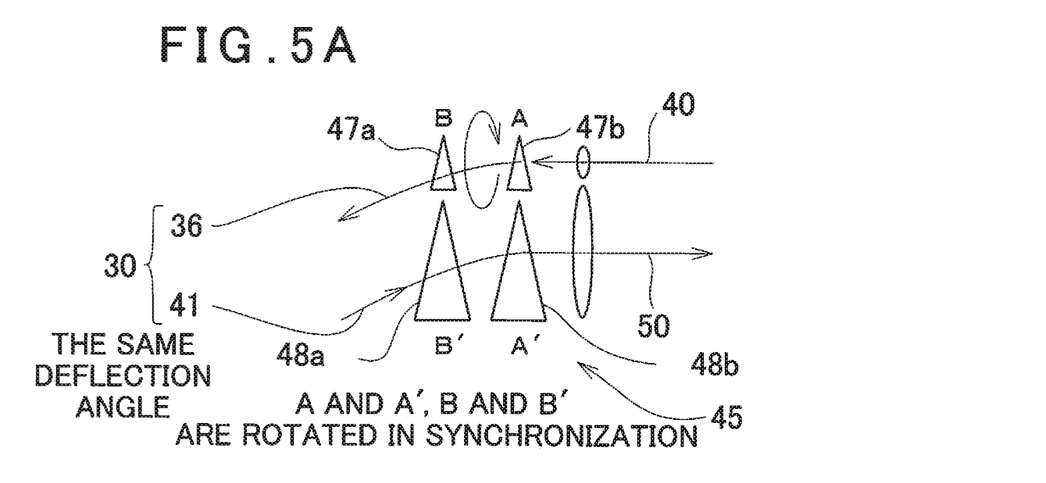
FIG. 5A, FIG. 5B and FIG. 5C are explanatory drawings to show an action of the optical axis deflector.

Next, a description of a deflecting action by the optical axis deflector 45 will be given by referring to FIG. 5A, FIG. 5B and FIG. 5C. It is to be noted that, in order to simplify an explanation, in FIG. 5A, the optical prisms 46a and 46b are shown by separating the prism elements 47a and 47b and the prism elements 48a and 48b. Further, the prism elements 47a and 47b and the prism elements 48a and 48b shown in FIG. 5A are in a state where the prism elements 47a and 47b and the prism elements 48a and 48b can obtain a maximum deflection angle. Further, a minimum deflection angle is obtained at a position where either one of the optical prisms 46a and 46b is rotated by 180°. A deflection angle at this moment is 0°, and an optical axis of a laser beam (the distance measuring light 40) to be emitted becomes parallel to the projection optical axis 36. The prism elements 47a and 47b are configured to enable to scan an object to be measured or a measurement target area by the distance measuring light 40 within a range of, for instance, ±20°.

The arithmetic control module 33 makes the distance measuring light 40 emit from the light emitter 37, and the distance measuring light 40 is turned to a parallel luminous flux by the projecting lens 38 and is emitted toward the object to be measured or the measurement target area through the distance measuring optical axis deflecting unit 45a (the prism elements 47a and 47b). Here, by passing through the distance measuring optical axis deflecting unit 45a, the distance measuring light 40 is deflected by the prism elements 47a and 47b in a required direction and is emitted.

The reflected distance measuring light 50 reflected by the object to be measured or the measurement target area is entered through the reflected distance measuring optical axis deflecting unit 45b (the prism elements 48a and 48b), and is focused on the photodetector 43 by the image forming lens 44.

When the reflected distance measuring light 50 passes through the reflected distance measuring optical axis deflecting unit 45b, an optical axis of the reflected distance measuring light 50 is deflected by the prism elements 48a and 48b so as to coincide with the light receiving optical axis 41. (FIG. 5).

Further, by combining a rotational position of the optical prism 46a with the optical prism 46b, the distance measuring light 40 to be emitted can be changed in an arbitrary deflecting direction and at an arbitrary deflection angle.

Further, if the optical prism 46a and the optical prism 46b are integrally rotated by the motors 52a and 52b in a condition where a positional relationship between the optical prism 46a and the optical prism 46b is fixed (that is, in a condition where a deflection angle obtained by the optical prism 46a and the optical prism 46b is fixed), a locus drawn by the distance measuring light 40 passing through the distance measuring optical axis deflecting unit 45a becomes a circle with the projection optical axis 36 as a center.

Therefore, when the optical axis deflector 45 is rotated while emitting the laser beam (the distance measuring light 40) from the light emitter 37, the distance measuring light 40 can be scanned by a circular locus around an arbitrary direction as deflected by the optical prisms 46a and 46b.

It is to be noted that, the reflected distance measuring optical axis deflecting unit 45b integrally rotates with the distance measuring optical axis deflecting unit 45a as a matter of course.

Figure 5B:
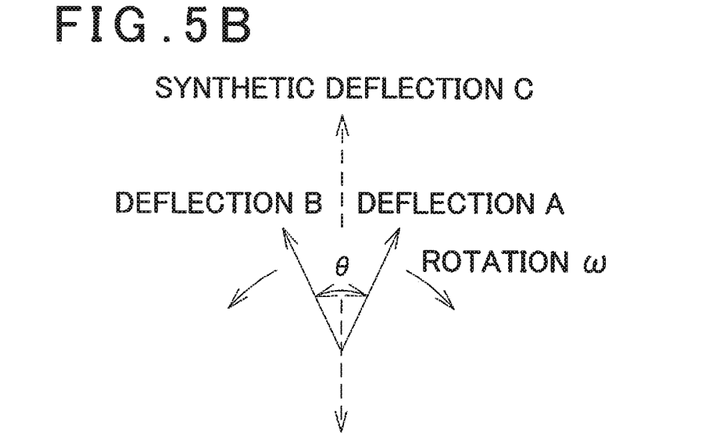

Next, FIG. 5B shows a case where the optical prism 46a and the optical prism 46b are relatively rotated. Assuming that a deflecting direction of the optical axis deflected by the optical prism 46a is a deflection "A" and a deflecting direction of the optical axis deflected by the optical prism 46b is a deflection "B", the deflection of the optical axes by the optical prisms 46a and 46b becomes a synthetic deflection "C" as an angle difference θ between the optical prisms 46a and 46b.

Therefore, every time the angle difference θ is changed and the optical axis deflector 45 is rotated by one rotation, the distance measuring light 40 is irradiated per every rotation, and the distance measuring light 40 can be scanned linearly. Further, every time the angle difference θ is changed, by rotating the optical axis deflector 45 in a state where the distance measuring light 40 is irradiated, the distance measuring light 40 can be scanned in a concentric and multi-circular form. Further, when the optical prism 46a and the optical prism 46b are rotated in opposite directions at the same speed, the distance measuring light 40 can be linearly scanned in a direction of the synthetic deflection C.

Figure 5C:
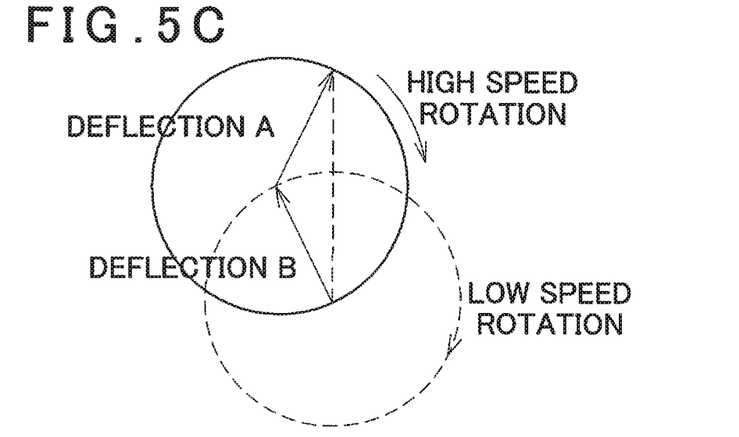

Further, as shown in FIG. 5C, when the optical prism 46b is rotated at a rotating speed lower than a rotating speed of the optical prism 46a, since the distance measuring light 40 is rotated while the angle difference e gradually increases, a scan locus of the distance measuring light 40 becomes a spiral form.

Furthermore, by individually controlling the rotating directions and the rotating speeds of the optical prism 46a and the optical prism 46b, the scan locus of the distance measuring light 40 can be performed in a radial direction (in the direction of a radius) with the projection optical axis 36 as the center, or is performed in a horizontal direction or vertical direction, or the like, and thereby, various scanning states can be obtained.

As a measurement mode, by performing a distance measurement in a condition where the optical axis deflector 45 is fixed per each deflection angle as required, the distance measurements of specific measuring points can be performed. Further, by carrying out the distance measurement while deflecting a deflection angle of the optical axis deflector 45, that is, by carrying out the distance measurement while scanning the distance measuring light 40, distance measurement data (point cloud data) with respect to a measuring point on the scan locus can be acquired.

A projection directional angle of each distance measuring light 40 can be detected based on the rotation angles of each of the motors 52a and 52b and the detection results of the up-and-down rotation angle detector 16 and the left-and-right rotation angle detector 22, and by associating the projection directional angle with the distance measurement data, three-dimensional distance measurement data can be acquired.

As described above, the field angle of the image pickup unit 26 is a wide field angle, for instance, 50°, and by substantially directing the surveying instrument 2 toward the target 3, it is possible to easily capture the target 3 within the field angle of the image pickup unit 26. Therefore, based on an image displayed on the display unit 35, the measuring operator can touch the prism 6 or select the prism 6 visually. For this reason, it is not necessary to sight the prism 6 by using a telescope as in the past.

It is to be noted that the field angle of the image pickup unit 26 coincides or approximately coincides with a deflection range of the optical axis deflector 45. Therefore, when the prism 6 is selected from an image picked up by the image pickup unit 26, the optical prisms 46a and 46b can be rotated so that the distance measuring light 40 is deflected toward the prism 6 as selected. Further, in a case where the prism 6 is positioned outside an image pickup range of the image pickup unit 26, the up-and-down driving motor 15 and the left-and-right driving motor 19 are driven so that the object to be measured is positioned within the image pickup range of the image pickup unit 26. It is to be noted that whether the prism 6 is positioned within the image pickup range can be confirmed by checking a presence or an absence of the prism 6 based on the image acquired by the image pickup unit 26 or by the image displayed on the display unit 35.

The reference optical axis O is parallel to the image pickup optical axis 53, and a distance between both of the optical axes is a known distance. Therefore, when the arithmetic control module 33 detects a deflecting direction and a deflection angle (a projection directional angle) by the optical axis deflector 45, the arithmetic control module 33 can coincide with an origin of the image pickup element 54 with the distance measuring optical axis 30 on the image acquired by the image pickup unit 26. Further, when the arithmetic control module 33 detects the projection directional angle of the distance measuring light 40 with respect to the reference optical axis O, the arithmetic control module 33 can specify a measuring point (an irradiating point of the distance measuring light 40) on the image acquired by the image pickup unit 26 based on the projection directional angle. Therefore, the three-dimensional distance measurement data of the measuring point can be easily associated with the image acquired by the image pickup unit 26, and the image acquired by the image pickup unit 26 can be turned to an image with three-dimensional data on which three-dimensional data are given for each pixel.

Further, the surveying instrument 2 includes the tracking light projecting unit 29 and the tracking light receiving unit 31. The tracking light is emitted from the light emitter 56, and the tracking light is turned to a luminous flux with a predetermined spread angle by the projecting lens 57 and emitted toward the object to be measured, for instance, the prism 6 through the distance measuring optical axis deflecting unit 45a (the prism elements 47a and 47b). Here, when the tracking light passes through the distance measuring optical axis deflecting unit 45a, the tracking light is deflected to a direction as required by the prism elements 47a and 47b and emitted onto the distance measuring optical axis 30.

The tracking light irradiates a range which includes the prism 6 and covers an image acquiring range of the tracking light photodetector 62. The reflected tracking light as reflected by the prism 6 enters through the reflected distance measuring optical axis deflecting unit 45b (the prism elements 48a and 48b) and is focused on the tracking light photodetector 62 by the image forming lens 44, the third reflection mirror 58, the condenser lens 59 and the fourth reflection mirror 61.

Based on a light receiving signal from the tracking light photodetector 62, the tracking module 32 obtains a photodetecting position of the reflected tracking light on the tracking light photodetector 62. The tracking module 32 detects a position of the prism 6 on the tracking light photodetector 62 based on the photodetecting position. Further, based on a detection result, the tracking module 32 obtains a deviation between a position of the prism 6 on the tracking light photodetector 62 and a reference position of the tracking light photodetector 62 (a position of the distance measuring optical axis 30 on the tracking light photodetector 62). This deviation corresponds to a relative deflection angle and a relative deflecting direction of the prism 6 with respect to the distance measuring optical axis 30. The relative deflection angle, the relative deflecting direction and the rotation angles of the optical prisms 46a and 46b at this moment are input to the arithmetic control module 33. It is to be noted that the tracking light projecting unit 29, the tracking light receiving unit 31 and the tracking module 32 may be generically referred to as a tracking unit.

Based on a calculation result in the tracking module 32, the arithmetic control module 33 controls the driving of the motors 52a and 52b. The arithmetic control module 33 rotates the optical prisms 46a and 46b so that the reflected tracking light from the prism 6 is received at a predetermined position on the tracking light photodetector 62, that is, so that the reflected tracking light is received with a predetermined deviation with respect to the reference position of the tracking light photodetector 62. Consequently, in a stationary state, the surveying instrument main body 7 allows the tracking light and the distance measuring light 40 to follow movements of the prism 6 in a state where a predetermined deflection angle is maintained. That is, the prism 6 is tracked in such a manner that an image of the prism 6 maintains the predetermined deviation with respect to the reference position of the tracking light photodetector 62.

With a control of individual rotations of the optical prisms 46a and 46b by the arithmetic control module 33, the distance measuring light 40 is scanned circularly with the optical center of the prism 6 (the reference optical axis O) as the center with the predetermined deviation as a radius. On the other hand, the reflected tracking light (a reflected image) from the prism 6 draws a circular locus on the tracking light photodetector 62 with the distance measuring optical axis 30 as the center with the rotations of the optical prisms 46a and 46b (see FIG. 6).

Figure 6:
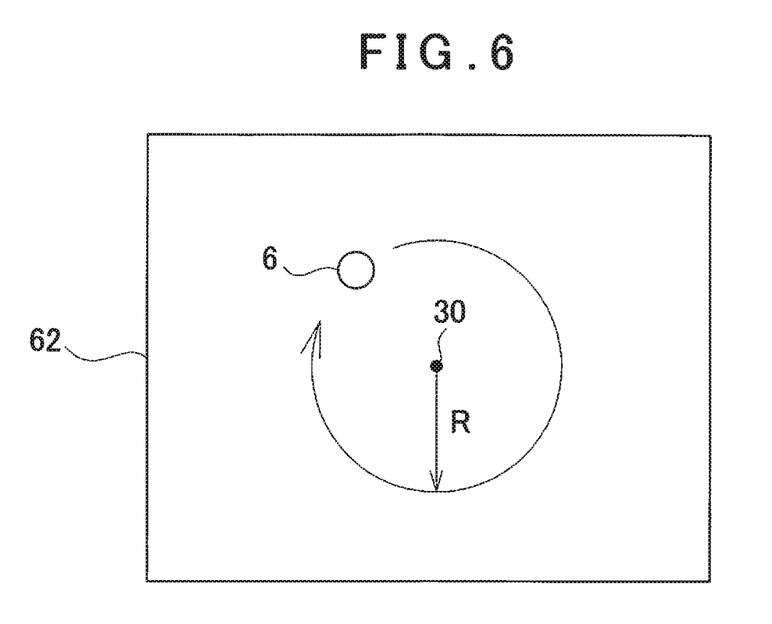
FIG. 6 is an explanatory drawing to show a positional relationship between an reflected image of a prism and a distance measuring optical axis on a tracking light photodetector.

At this moment, in a case where the third reflection mirror 58 has optical characteristics to reflect the reflected distance measuring light 50, a photodetecting position of the reflected distance measuring light 50 is a center of the tracking light photodetector 62. Therefore, as shown in FIG. 6, the reflected tracking light from the prism 6 draws a circle with a radius R, which is obtained based on the deviation, with the distance measuring optical axis 30 as the center on the tracking light photodetector 62.

Figure 7:
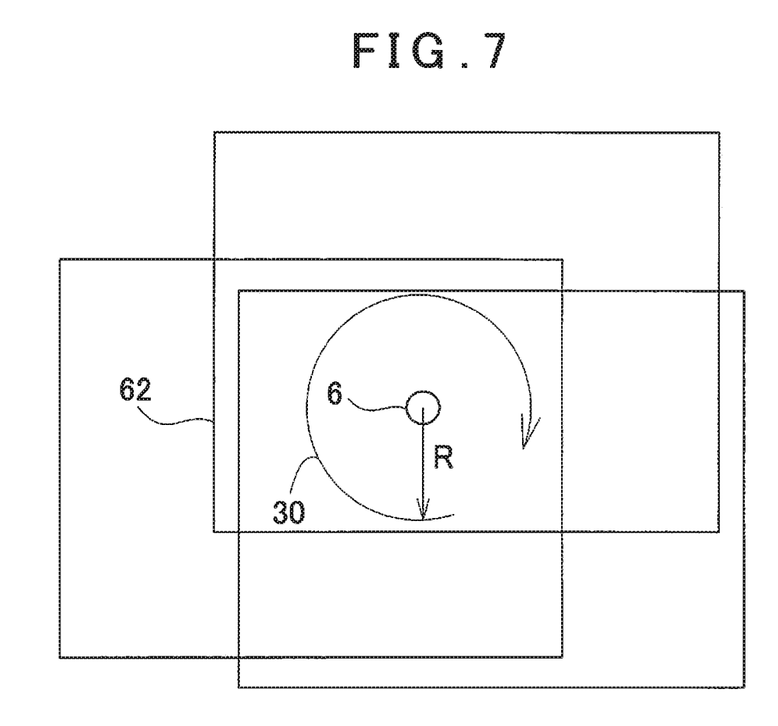
FIG. 7 is an explanatory drawing to show a positional relationship of the distance measuring optical axis in a case where the reflected image of the prism is positioned at a center.

FIG. 7 shows a drawing in which the images are overlapped in such a manner that the reflected image from the prism 6 is positioned at the center, and the tracking light photodetector 62 is rotated corresponding to the rotations of the optical prisms 46a and 46b. In this case, the distance measuring optical axis 30 draws a circle with a radius "R" with the reflected image of the prism 6 as the center.

It is to be noted that, when a position of the prism 6 exceeds a tracking range by the optical axis deflector 45, needless to say, the arithmetic control module 33 drives the up-and-down driving motor 15 and the left-and-right driving motor 19 and rotates the surveying instrument main body 7 so as to direct toward the prism 6.

Figure 8:
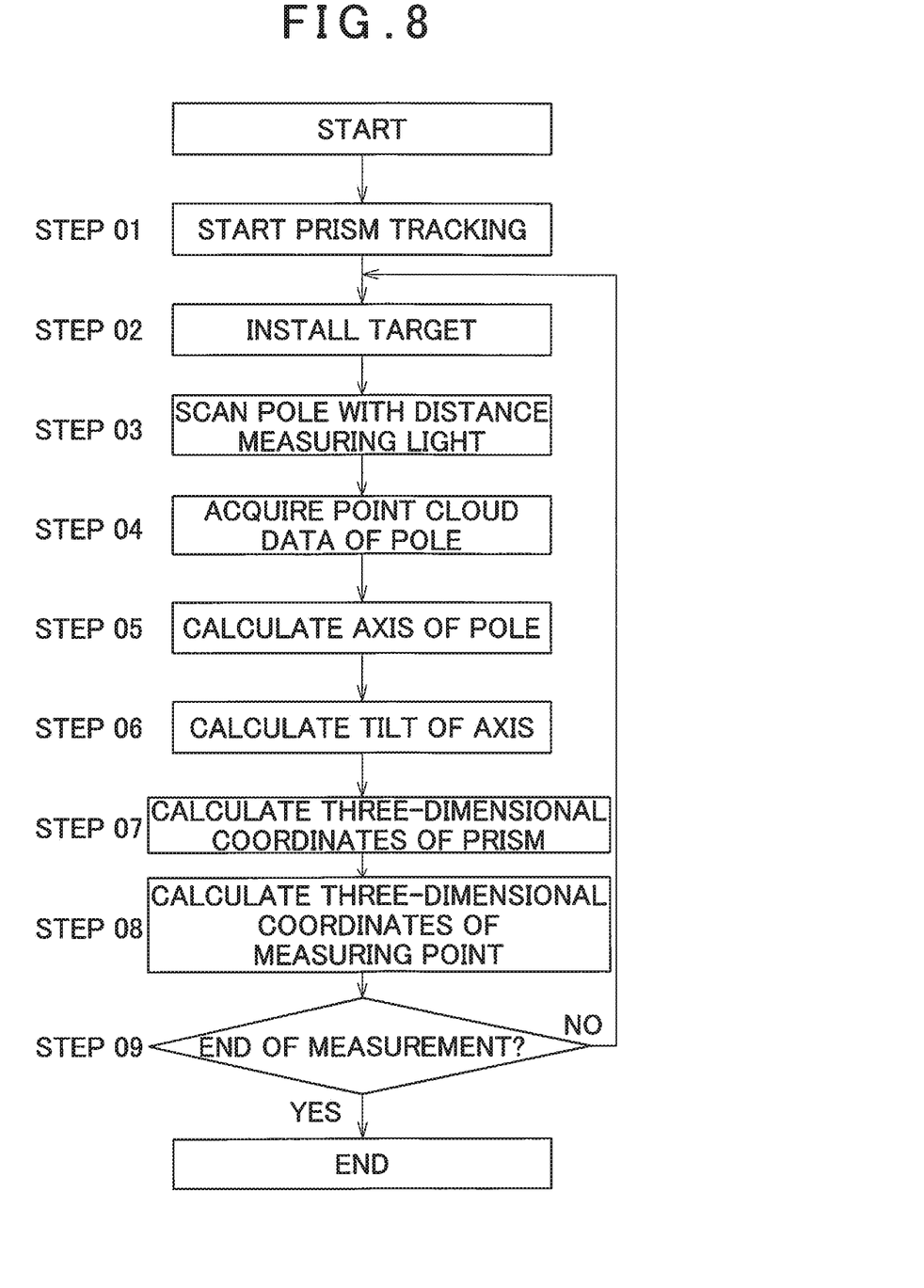
FIG. 8 is a flowchart to explain a surveying operation of a measuring point using the surveying system according to the first embodiment of the present invention.

Next, a description will be given on a tracking of the prism 6 and a surveying operation using the surveying instrument 2 by referring to a flowchart of FIG. 8.

(Step 01) When the measurement of the measuring point 10 (see FIG. 1) at which the target 3 is installed by the surveying instrument 2, at first, the deflection angle of the optical axis deflector 45 is set, and the arithmetic control module 33 starts the tracking of the prism 6 by the tracking module 32. The tracking light is irradiated from the tracking light projecting unit 29, and the optical prisms 46a and 46b are rotated in a predetermined rotation state. During the tacking, the reflected tracking light from the prism 6 is received at a position of the deflection angle of the tracking light photodetector 62, which is set with respect to the distance measuring optical axis 30.

(Step 02) After starting the tracking of the prism 6, the lower end of the pole 5 is set at the measuring point 10 as predetermined, and the target 3 is installed.

(Step 03) When the target 3 is installed, the arithmetic control module 33 starts the distance measurement by the distance measuring light 40, and a surveying operation of the measuring point 10 is performed. The optical prisms 46a and 46b are rotated by the arithmetic control module 33 in such a manner that the reflected tracking light from the prism 6 is received at the predetermined deflection angle with respect to the distance measuring optical axis 30. As shown in FIG. 1 and FIG. 7, the distance measuring light 40 at this moment is scanned with a circular locus 65 with the optical center (the tracking optical axis 55) of the prism 6 as the center. Further, the arithmetic control module 33 measures a distance to the pole 5 of when a circular scanning passes the pole 5, and a deflection angle of each of the optical prisms 46a and 46b is adjusted in such a manner that the locus 65 of the circular scanning fits into a length of the pole 5. It is to be noted that the distance measurement of the target 3 may be performed in parallel with the start of the tracking of the prism 6.

(Step 04) When the distance measuring light 40 is scanned by the circular scanning, the pole 5 and the locus 65 of the circular scanning intersect with each other at two upper and lower positions of the prism 6, and the arithmetic control module 33 acquires point cloud data of the two positions.

(Step 05) Based on the point cloud data as aquired, the arithmetic control module 33 detects edges of both left and right side rims of two upper and lower positions of the pole 5, respectively. Further, based on three-dimensional coordinates of the edges as detected, the arithmetic control module 33 calculates an axis 66 of the pole 5 (see FIG. 1) running through the optical center of the prism 6. It is to be noted that, since a radius of the pole 5 is known, a cylinder having a radius equivalent to the pole 5 may be fitted with respect to the point cloud data, and an axis of the cylinder may be calculated as the axis 66.

(Step 06) Next, based on three-dimensional coordinates of the axis 66 and a radius (a deflection angle) of the locus 65, the arithmetic control module 33 calculates a tilt of the axis 66, that is, tilt angles of the pole 5 in a front-and-rear direction and the left-and-right direction (two horizontal directions with respect to the verticality).

(Step 07) The distance measuring light 40 draws the locus 65 of a circle with the prism 6 as the center. The arithmetic control module 33 calculates a straight line on a peripheral surface of the pole 5 which is parallel to the axis 66, intersects with the locus 65 at two points of an upper side and a lower side and intersects with the tracking optical axis 55.

Here, an irradiating direction of the tracking light (a deflecting direction of the tracking optical axis 55) can be detected based on the photodetecting position of the tracking light photodetector 62. Therefore, the arithmetic control module 33 can calculate an intersection point of the straight line and the tracking optical axis 55 (a direction vector of the prism 6) and can calculate three-dimensional coordinates of the optical center of the prism 6 based on three-dimensional coordinates of the intersection point.

Figure 1:
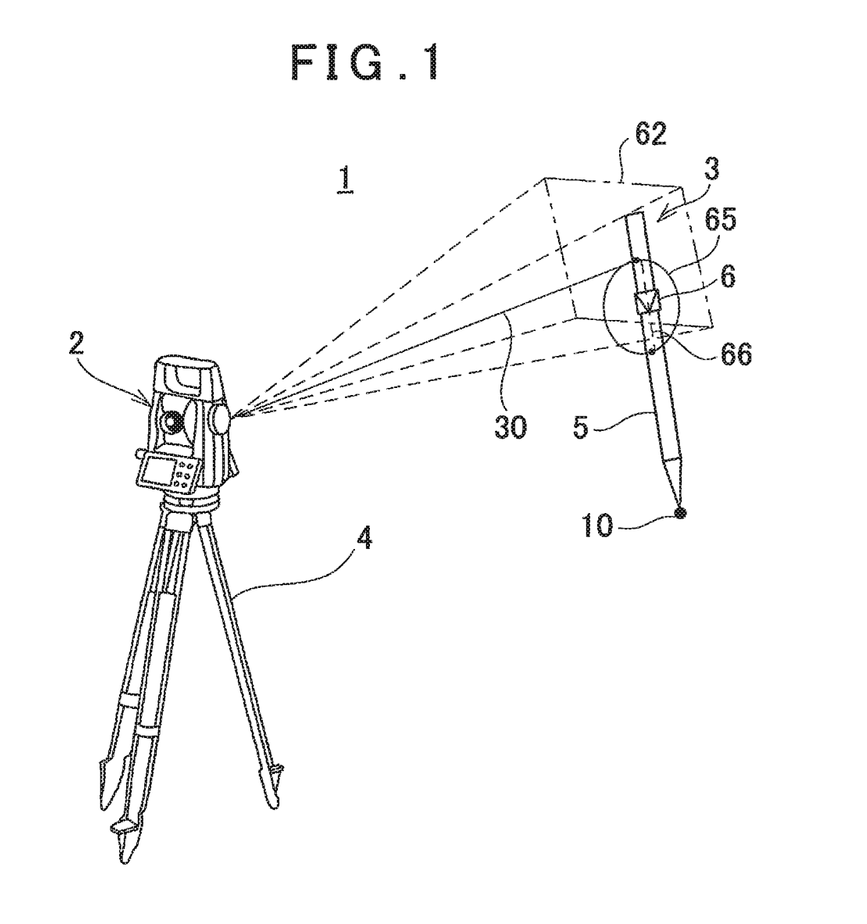
FIG. 1 is a perspective view to show a surveying system according to a first embodiment of the present invention.

For instance, assuming that, when the distance measuring light 40 is irradiated at an upper intersection point, an angle formed between the distance measuring optical axis 30 and the tracking optical axis 55 is "α", a tilt angle of the pole 5 with respect to the surveying instrument 2 in the front-and-back direction (a tilt angle in the left-and-right direction with respect to a paper face in FIG. 1) is "β", a distance from the surveying instrument 2 to the upper intersection point is "d", and a length between the upper intersection point and the optical center of the prism 6 is "1", 1=d sin α/sin β is achieved.

Therefore, the arithmetic control module 33 can calculate three-dimensional coordinates of a point which is positioned by a distance 1 in a downward direction from the upper intersection point along the straight line as an intersection point of the straight line and the tracking optical axis 55. Further, the arithmetic control module 33 can calculate the three-dimensional coordinates of the optical center of the prism 6 based on the three-dimensional coordinates of the intersection point of the straight line and the tracking optical axis 55, a tilt of the axis 66 and the radius of the pole 5 (a positional relationship (a distance) between the straight line and the axis 66).

(Step 08) Finally, the arithmetic control module 33 calculates three-dimensional coordinates of the measuring point 10 based on the three-dimensional coordinates of the optical center of the prism 6, the distance between the optical center of the prism 6 and the lower end of the pole 5, and a tilt angle of the axis 66.

(Step 09) In case of performing the measurement of other measuring points, the target 3 is installed at other measuring points, and a processing of (Step 03) to (Step 08) is again carried out. Further, in a case where there are no other measuring points to be measured, a surveying processing is finished.

As described above, in the first embodiment, when the arithmetic control module 33 makes the distance measuring light 40 track the prism 6 so that the locus 65 of the circle is drawn with the optical center of the prism 6 as the center, the arithmetic control module 33 can calculate the axis 66 of the pole 5, the tilt angle of the axis 66 and the three-dimensional coordinates of the optical center of the prism 6 based on the point cloud data.

Therefore, based on the three-dimensional coordinates of the optical center of the prism 6, the tilt angle of the axis 66 and the distance between the optical center of the prism 6 to the lower end of the pole 5, the arithmetic control module 33 can calculate the three-dimensional coordinates of the measuring point 10. As a result, there is no need to level so that the optical center of the prism 6 is positioned on a vertical line of the measuring point 10 when the target 3 is installed, and a reduction in a working time and an improvement in a workability can be realized.

Further, even in a state where the pole 5 tilts without being leveled, a prism surveying of the measuring point 10 by the surveying instrument 2 can be performed. As a result, a working time, in particular, of a case where a plurality of measuring points are measured, can be extensively reduced. Further, a measuring point on a ceiling, a sidewall and the like can be similarly measured.

Further, there is no need to additionally provide a component for detecting a tilt of the pole 5 on the target 3. As a result, a simplification of a structure and a reduction in a manufacturing cost can be realized.

Figure 9:
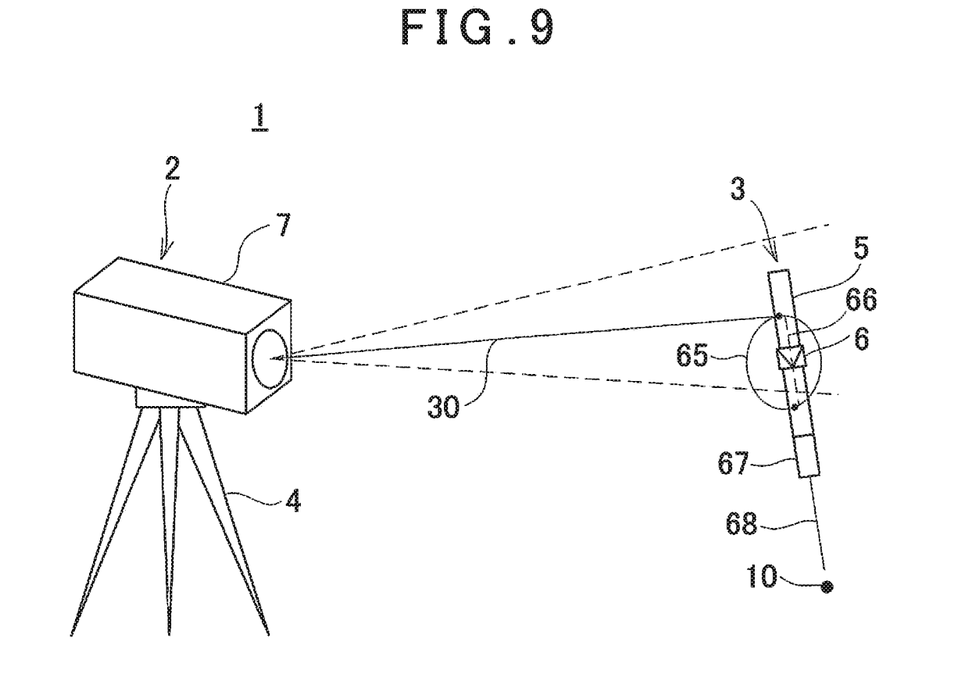
FIG. 9 is a perspective view to show a surveying system according to a second embodiment of the present invention.

Next, a description will be given on a second embodiment according to the present invention by referring to FIG. 9. It is to be noted that, in FIG. 9, the equivalent components as shown in FIG. 1 are referred by the same symbol, and a detailed description thereof will be omitted.

In the second embodiment, an electronic distance meter 67 is provided at a lower end of a pole 5. A distance between an optical center of a prism 6 and a measurement reference position of the electronic distance meter 67 is known. An optical axis of a pointer beam 68 which is emitted from the electronic distance meter 67 and functions as a distance measuring light is the same as an axis 66 of the pole 5. The electronic distance meter 67 measures a distance from the measurement reference position to a point irradiated with the pointer beam 68.

Structures other than the electronic distance meter 67 are the same as the first embodiment. Further, three-dimensional coordinates of the optical center of the prism 6 and a tilt angle of the axis 66 can be obtained by the same method as the first embodiment.

When a measuring point 10 is surveyed by a surveying instrument 2 of the second embodiment, the pointer beam 68 emitted from the electronic distance meter 67 is pointed to the measuring point 10. Based on the three-dimensional coordinates of the optical center of the prism 6, the tilt angle of the axis 66, the distance between the measurement, reference position of the electronic distance meter 67 and the optical center of the prism 6 and a distance measurement result of the electronic distance meter 67 to an irradiating point, the arithmetic control module 33 can calculate three-dimensional coordinates of the measuring point 10.

Also in the second embodiment, the optical center of the prism 6 need not to be positioned on a vertical line of the measuring point 10. As a result, an installation operation of a target 3 can be facilitated, and a reduction in a working time and an improvement in a workability can be realized.

It is to be noted that, in the first embodiment and the second embodiment, although a radius of the pole 5 becomes the same radius throughout an entire length, the radius of the pole 5 may differ on an upper side and a lower side of the prism 6. When the radius of the pole 5 differs, the arithmetic control module 33 can detect a direction of the lower end of the pole 5 with respect to the prism 6 based on acquired point cloud data. Therefore, even in a case where the lower end of the pole 5 is not positioned in a downward direction of the prism 6 such as a measuring point of a ceiling or the like, a direction of the measuring point can be distinguished, and three-dimensional coordinates of the measuring point can be easily calculated.

Further, in the first embodiment and the second embodiment, although the prism 6 is provided on the pole 5, the prism 6 may be provided on a reflecting plate. In this case, the reflecting plate is provided on the pole 5, the prism 6 is provided in such a manner that the optical center of the prism 6 is positioned on the axis 66 of the pole 5, and a reference line which runs through the optical center of the prism 6 and is parallel to the axis 66 is formed on the reflecting plate.

When the surveying operation of the measuring point 10 is performed, the arithmetic control module 33 calculates three-dimensional coordinates of two intersection points of the locus 65 of when the distance measuring light 40 is scanned by the circular scanning and the reference line in a state where the prism 6 is tracked. Further, the arithmetic control module 33 calculates the tilt of the axis 66 based on the three-dimensional coordinates of the two intersection points. Further, an intersection point of a straight line connecting the two intersection points and the tracking optical axis 55 (the direction vector of the prism 6) is calculated as the three-dimensional coordinates of the optical center of the prism 6.

Therefore, based on the three-dimensional coordinates of the optical center of the prism 6, the tilt of the axis 66 and the distance between the optical center of the prism 6 and the lower end of the pole 5, the arithmetic control module 33 can calculate the three-dimensional coordinates of the measuring point 10.

It is to be noted that although the reference line is a straight line parallel to the axis 66 in the above description, the reference line may have other shapes such as a cross-like shape or the like if the reference line is formed in a radial shape at an equal angular interval with the optical center of the prism 6 as the center. In this case, it would suffice if the reference line and the locus 65 intersect with each other at least at three points. Based on three-dimensional coordinates of three intersection points, a direction and a tilt of the reflecting plate can be calculated. As a result, the three-dimensional coordinates of the measuring point 10 can be calculated based on a calculation result.

The invention claimed is:

1. A surveying system which has a surveying instrument and a target installed at a measuring point, wherein said surveying instrument comprises a distance measuring module for emitting a distance measuring light, receiving a reflected distance measuring light and performing a distance measurement, a tracking module which has a light emitter for emitting a tracking light onto an optical axis of said distance measuring light and a tracking light photodetector for receiving a reflected tracking light and performing a tracking based on a photodetecting position of said tracking light photodetector, an optical axis deflector which is provided on a common optical axis of said distance measuring light and said reflected distance measuring light and deflects the optical axis of said distance measuring light and an optical axis of said reflected distance measuring light at the same deflection angle in the same direction, a projecting direction detecting module for detecting a deflection angle and a deflecting direction by said optical axis deflector and an arithmetic control module for controlling said distance measuring module and said tracking module, wherein said target comprises a pole of which a peripheral surface has a high reflectance and a prism which is provided on an axis of said pole and has a known distance from a lower end of said pole, and wherein said arithmetic control module is configured to scan said distance measuring light with an optical center of said prism as a center by a circular scanning in a state where said prism is tracked, to acquire point cloud data of two points at which said pole intersects with the circular scanning, to calculate said axis of said pole and a tilt angle of said axis of said pole based on said point cloud data of said two points, to calculate a straight line on said pole which is parallel to said axis of said pole and intersects with the circular scanning at two points, to calculate three-dimensional coordinates of two intersection points of said straight line and the circular scanning, to calculate three-dimensional coordinates of said optical center of said prism based on the obtained three-dimensional coordinates and an intersection point of said straight line and a direction vector of said prism from said surveying instrument, and to calculate three-dimensional coordinates of said measuring point based on the three-dimensional coordinates of said optical center of said prism, the tilt angle of said axis of said pole and a distance between the three-dimensional coordinates of said optical center of said prism and the lower end of said pole.

2. The surveying system according to claim 1, wherein a distance between the lower end of said pole and said optical center of said prism is known, an electronic distance meter having an optical axis coinciding with said axis of said pole is provided, and said arithmetic control module is configured to calculate the three-dimensional coordinates of said measuring point based on the three-dimensional coordinates of said optical center of said prism, the tilt angle of said axis of said pole, the distance between said optical center of said prism and a measurement reference position of said electronic distance meter and a distance measurement result of said electronic distance meter.

3. The surveying system according to claim 1, wherein said surveying instrument comprises a surveying instrument main body which accommodates said distance measuring module, said optical axis deflector, said projecting direction detecting module, said tracking module and said arithmetic control module, a supporting unit for supporting said surveying instrument main body rotatably in an up-and-down direction and a left-and-right direction, a rotary driving unit for rotating said surveying instrument main body in the up-and-down direction and the left-and-right direction and angle detectors for detecting an up-and-down angle and a left-and-right angle of said surveying instrument main body.

4. The surveying system according to claim 1, wherein said optical axis deflector is a pair of disk-like optical prisms which are independently rotatable and overlap each other, each of said optical prisms has a distance measuring optical axis deflecting unit which is formed at a central part of said optical axis deflector and deflects said distance measuring light at a required deflection angle in a required direction and a reflected distance measuring optical axis deflecting unit which is formed at an outer peripheral part of said optical axis deflector and deflects said reflected distance measuring light at the same deflection angle in the same direction with respect to said distance measuring optical axis deflecting unit.

5. The surveying system according to claim 4, wherein each of said optical prisms is a Fresnel prism.

6. The surveying system according to claim 1, wherein said target has said pole, a reflecting plate provided on said pole and said prism provided on said reflecting plate in such a manner that an optical center is positioned on said axis of said pole, and a reference line which runs through said optical center of said prism and is parallel to said axis of said pole is formed on said reflecting plate, and wherein said arithmetic control module is configured to scan said distance measuring light by the circular scanning in such a manner that a locus is included within said reflecting plate with said optical center of said prism as the center in a state where said prism is tracked, to calculate three-dimensional coordinates of two intersection points of the circular scanning and said reference line, to calculate said axis of said pole and the tilt angle of said axis of said pole based on the obtained three-dimensional coordinates, to calculate an intersection point of a straight line connecting said two intersection points and the direction vector of said prism from said surveying instrument as the three-dimensional coordinates of said optical center of said prism, and to calculate the three-dimensional coordinates of said measuring point based on the three-dimensional coordinates of said optical center of said prism, the tilt angle of said axis of said pole, and the distance between the three-dimensional coordinates of said optical center of said prism and the lower end of said pole.

7. The surveying system according to claim 2, wherein said surveying instrument comprises a surveying instrument main body which accommodates said distance measuring module, said optical axis deflector, said projecting direction detecting module, said tracking module and said arithmetic control module, a supporting unit for supporting said surveying instrument main body rotatably in an up-and-down direction and a left-and-right direction, a rotary driving unit for rotating said surveying instrument main body in the up-and-down direction and the left-and-right direction and angle detectors for detecting an up-and-down angle and a left-and-right angle of said surveying instrument main body.

8. The surveying system according to claim 2, wherein said optical axis deflector is a pair of disk-like optical prisms which are independently rotatable and overlap each other, each of said optical prisms has a distance measuring optical axis deflecting unit which is formed at a central part of said optical axis deflector and deflects said distance measuring light at a required deflection angle in a required direction and a reflected distance measuring optical axis deflecting unit which is formed at an outer peripheral part of said optical axis deflector and deflects said reflected distance measuring light at the same deflection angle in the same direction with respect to said distance measuring optical axis deflecting unit.

9. The surveying system according to claim 3, wherein said optical axis deflector is a pair of disk-like optical prisms which are independently rotatable and overlap each other, each of said optical prisms has a distance measuring optical axis deflecting unit which is formed at a central part of said optical axis deflector and deflects said distance measuring light at a required deflection angle in a required direction and a reflected distance measuring optical axis deflecting unit which is formed at an outer peripheral part of said optical axis deflector and deflects said reflected distance measuring light at the same deflection angle in the same direction with respect to said distance measuring optical axis deflecting unit.

10. The surveying system according to claim 7, wherein said optical axis deflector is a pair of disk-like optical prisms which are independently rotatable and overlap each other, each of said optical prisms has a distance measuring optical axis deflecting unit which is formed at a central part of said optical axis deflector and deflects said distance measuring light at a required deflection angle in a required direction and a reflected distance measuring optical axis deflecting unit which is formed at an outer peripheral part of said optical axis deflector and deflects said reflected distance measuring light at the same deflection angle in the same direction with respect to said distance measuring optical axis deflecting unit.

* * * * *